No. 710,788. Patented Oct. 7, 1902.
L. LYNDON.
GOVERNOR FOR WATER WHEELS OR OTHER MOTOR DEVICES.
(Application filed Oct. 23, 1901.)
(No Model.) 3 Sheets—Sheet 1.
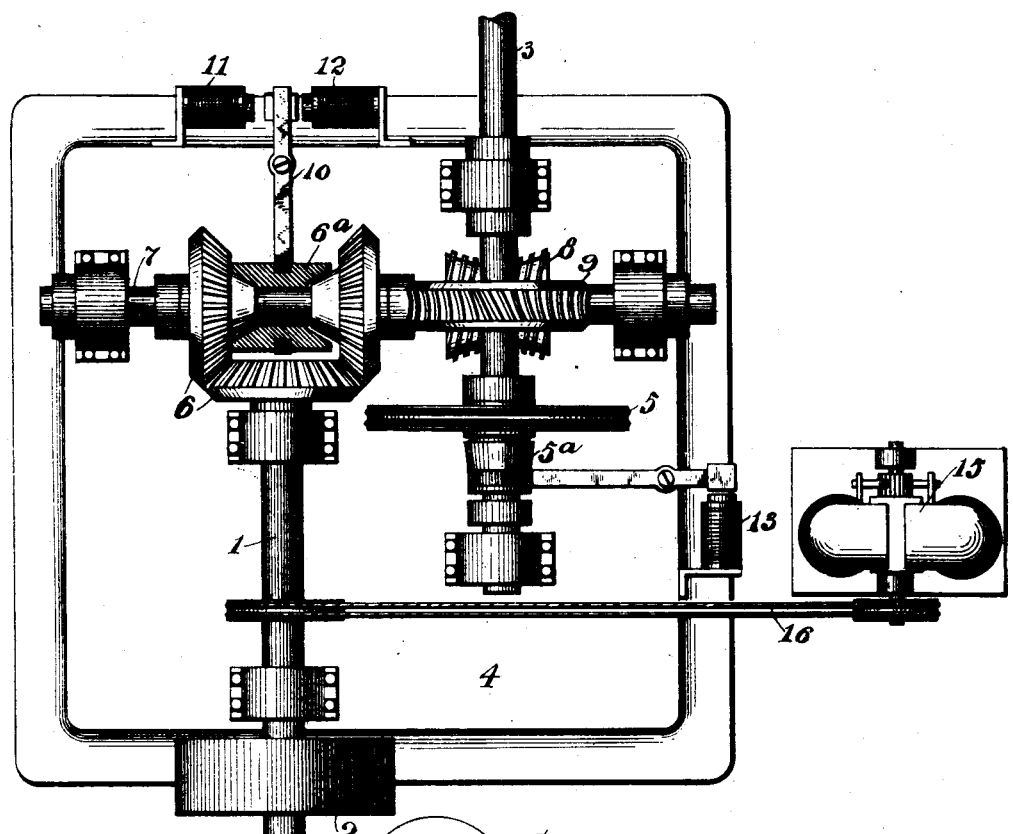
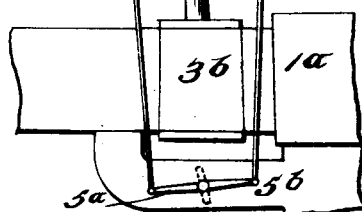
Witnesses
Inventor.

No. 710,788. Patented Oct. 7, 1902.
L. LYNDON.
GOVERNOR FOR WATER WHEELS OR OTHER MOTOR DEVICES.
(Application filed Oct. 23, 1901.)
(No Model.) 3 Sheets—Sheet 2.
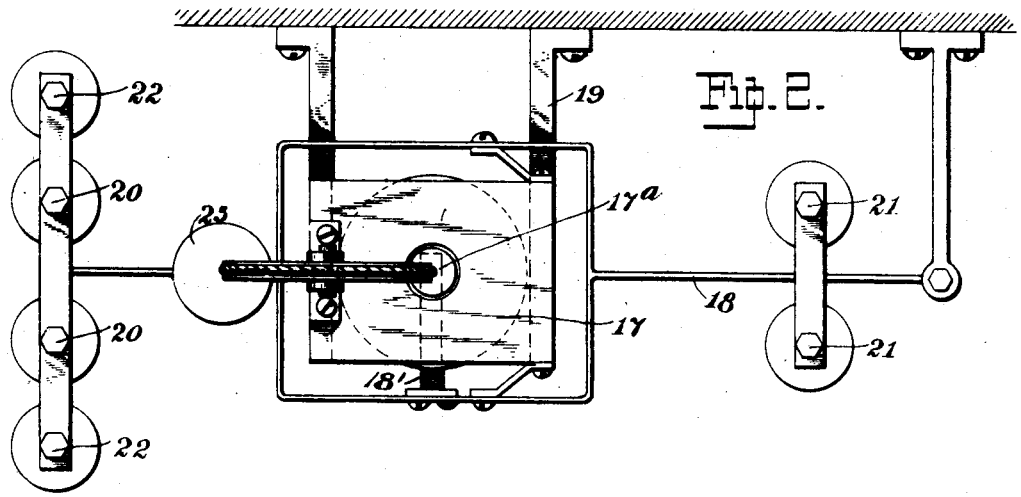
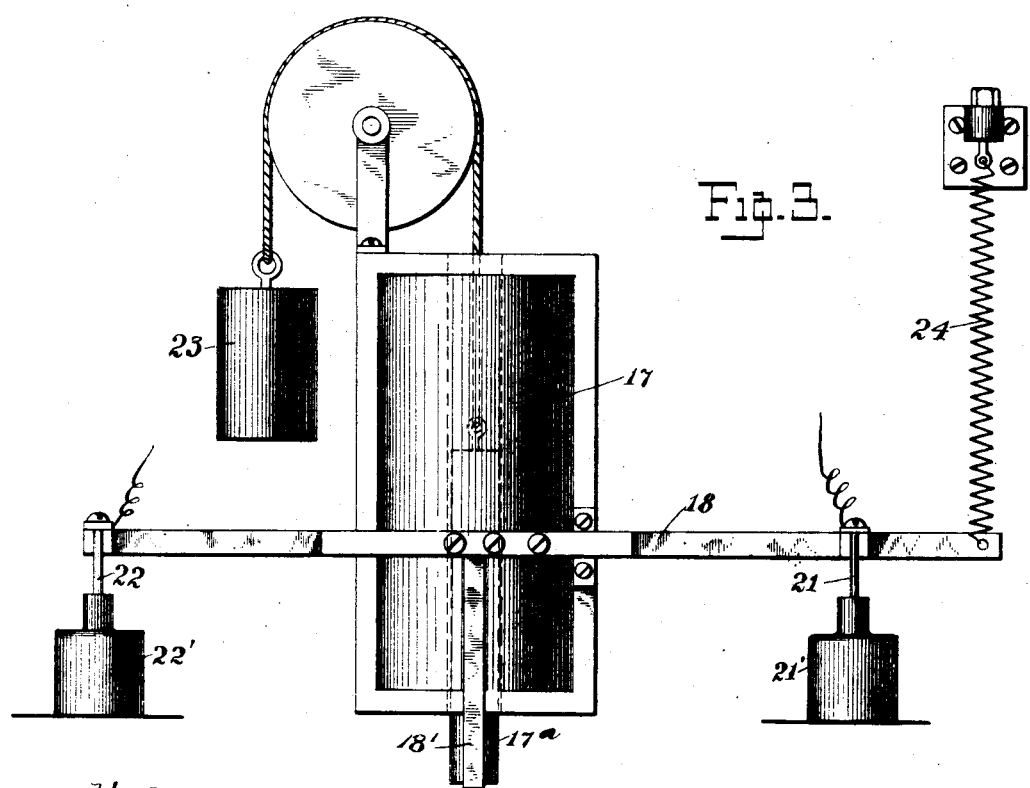
Witnesses
Inventor

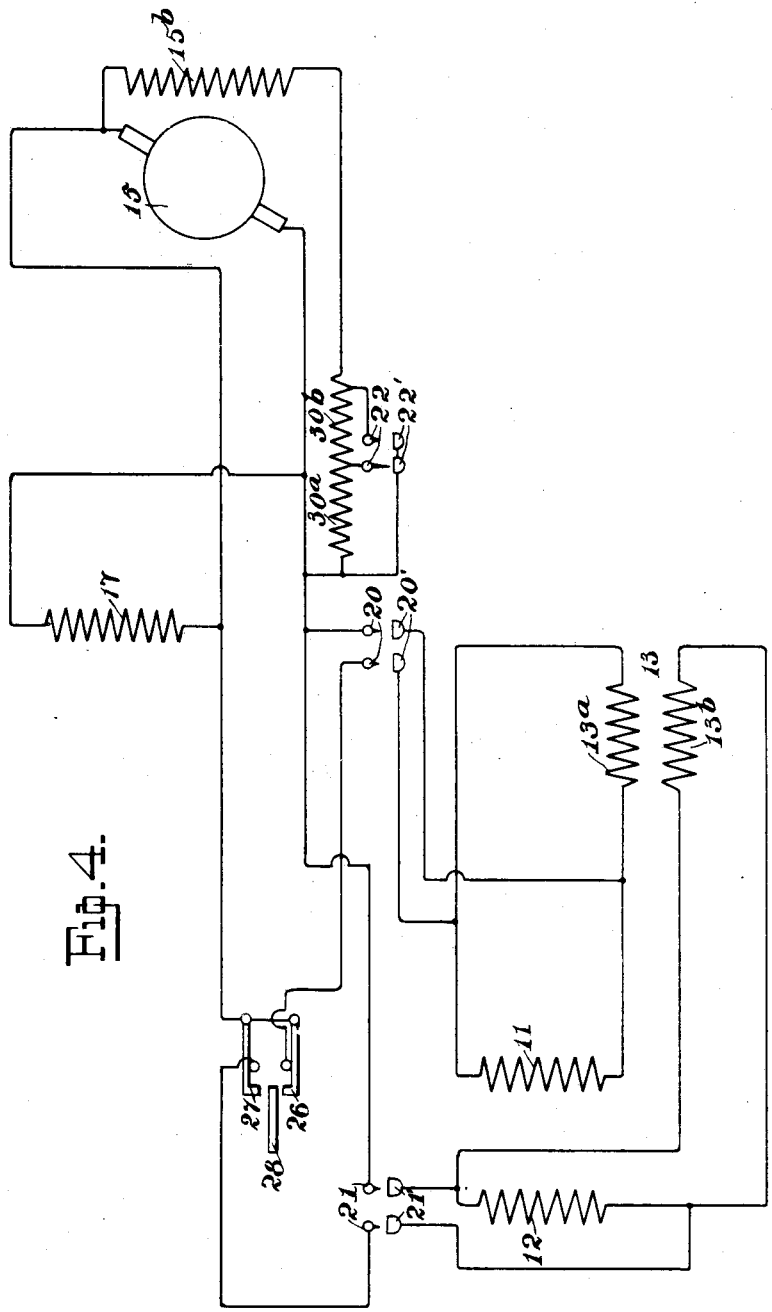

UNITED STATES PATENT OFFICE.

LAMAR LYNDON, OF NEW YORK, N. Y.

GOVERNOR FOR WATER-WHEELS OR OTHER MOTOR DEVICES.

SPECIFICATION forming part of Letters Patent No. 710,788, dated October 7, 1902.

Application filed October 23, 1901. Serial No. 79,715. (No model.)

*To all whom it may concern:*

Be it known that I, LAMAR LYNDON, a citizen of the United States, residing at New York, in the county and State of New York, have invented certain new and useful Improvements in Governors for Water-Wheels or other Motor Devices, of which the following is a specification.

This invention relates to improvements in the type of water-wheel governor shown in my application Serial No. 29,880, filed September 13, 1900; and the object of the invention is to simplify the apparatus and render it more efficient in operation.

The main feature of my present invention is the means for preventing overrunning of the governor. In my said application such means consisted of mechanism operated by the governor-power and brought into operation when the governor-controlling devices are actuated to force said devices back to inoperative position before the governor has passed the proper regulating position. My governor apparatus is controlled, as in above-named application, by electromagnetic devices energized by a dynamo that is driven by connection with the water-wheel, so that its voltage is responsive to the speed of the wheel, and in my present invention I provide means for regulating this dynamo on the operation of the electromagnetic device, so as to counteract its effect on said device before the governor passes the proper speed. This electrical control is simple and is more efficient because more rapid in action and less liable to failure by reason of mechanical difficulties.

My present invention also simplifies the construction by arranging the several controlling-contacts for the governor on a single controller-lever operated directly by the dynamo-controlled magnet or solenoid. The controller thus becomes dissociated mechanically from the governor mechanism, and it need not be placed in proximity to such mechanism, but may be located in some place which may be more convenient for inspection and adjustment.

In the accompanying drawings, Figure 1 is a plan view of the governor-operating mechanism proper with the controlling-dynamo. Fig. 1$^a$ is a somewhat diagrammatic view showing the general relation of the governing devices to the water-gate, &c. Fig. 2 is a plan view, and Fig. 3 a side elevation, of the electromagnetic controller. Fig. 4 is a diagram of the electrical connections.

The shaft 1 is connected to and driven by the turbine-shaft through a pulley 2, and the shaft 3 is connected to operate the gate for the turbine in any usual manner. A by-pass gate for the turbine may also be provided, as described in my aforesaid application, and such by-pass is operated from pulleys 5 on shaft 3 in the manner set forth in that application. Thus in Fig. 1$^a$ the shaft 3 is connected by bevel-gearing 3' to the shaft 3$^a$, which controls the water-gate 3$^b$, and the pulley 5 is connected by cords 5' with the lever 5$^a$ of a valve in the by-pass 5$^b$, which is connected around the gate 3$^b$ and the turbine 1$^a$. These shafts 1 and 3 are journaled on a suitable base 4, and a reversing-clutch gear 6 is arranged to connect driving-shaft 1 with a shaft 7, which is connected by worm-gearing 8 9 with the gate-shaft 3, so that when the clutch 6$^a$ of the reversing-gear is moved one way or the other the gate-shaft 3 is turned correspondingly. This clutch 6$^a$ is controlled by an armature-lever 10, actuated reversely by magnets 11 12. Another magnet 13 controls a clutch 5$^a$ to control the operation of the by-pass valve or gate by the shaft 3.

The controller or feeler dynamo 15 is mechanically connected by belts 16 or otherwise, so as to be driven from shaft 1, and it is electrically connected to a controller magnet or solenoid 17, so that the energization of such magnet depends on the speed of the turbine. This dynamo is a shunt-wound machine, preferably undersaturated, as stated in my said application. The several clutch-magnets 11, 12, and 13 may be energized from any suitable source, preferably the dynamo 15, through circuits which are controlled by a lever 18 of the controller.

The preferred construction of the controller is shown in Figs. 2 and 3, the same comprising a solenoid 17, mounted on a suitable bracket 19, and a lever 18, pivoted to said bracket and carrying pairs of contacts 20 and 22 at one end and a pair of contacts 21 at the other end, said lever 18 having an arm 18' secured to the bottom of core 17$^a$ of the solenoid. These contacts coöperate, respectively, with mercury-cups or other fixed contacts 20', 21', and 22'. The weight of core 17ª of solenoid 17 is counterbalanced by a counterweight 23, and a spring 24 is connected to lever 18, so as to oppose the movement of same by the energization of the solenoid.

The connections of the above-described parts are shown in Fig. 4. Contacts 20 20' control the connection from the dynamo to clutch-magnet 11. Contacts 21 21' at the other end of the controller-lever control the connection to magnet 12. In normal position of the lever 18 all of the contacts are open, this being the condition at normal speed. When the turbine increases in speed, the voltage of the dynamo rises and the controller solenoid 17 draws lever 18, so as to cause contacts 20 20' to close connection to magnet 11 and throw clutch 6ª to turn the water-gate to cut off some of the water. At the same time magnet 13 is energized by a shunt around magnet 11, so as to clutch in the by-pass-actuating devices. In a reverse movement of the lever 18, due to slowing up of the turbine, magnet 12 is energized through contacts 21 21' to throw the clutch in reverse connection and at the same time magnet 13 is energized by a shunt around magnet 12. To permit of energization of magnet 13 in this manner, I provide same with two coils 13ª 13ᵇ, as shown, connected, respectively, in shunt or in series with the magnets 11 12.

The main feature of my present invention is directed to the prevention of overrunning of the governor, and to this end I provide the dynamo 15 with means for varying its effect on the solenoid-circuit inversely to the action of the solenoid itself. Thus I have shown in Fig. 4 a resistance 30ª 30ᵇ, connected in circuit with the shunt field-magnet 15ᵇ and also connected to contacts 22. One of these contacts is longer than the other movable contacts, so that in the normal position of lever 18 this contact closes, through one of the contacts 22', a connection from an intermediate part of resistances 30ª 30ᵇ to one side of the dynamo, thereby shortening a portion of such resistances. If this end of lever 18 be depressed, the other contact 22 will also close connection, thereby short-circuiting all the resistance from the field-circuit, while if this end of the lever rises it will open both contacts 22, thus placing all the resistance in the field-circuit. Under normal conditions with part of the resistance cut out the field of the dynamo is of proper strength to energize the controller-solenoid to a degree sufficient to hold the lever 18 in the normal position described; but if the speed of the turbine be increased and the lever 18 be correspondingly operated by the controller to close contacts 21 21' and to cause partial shutting of the water-gate it will at the same time open contacts 22 22', and thereby insert more resistance in the field-circuit and decrease the strength of the field, so as to tend to restore the voltage in the controller-circuit to normal condition before the governor has time to bring the turbine back to normal speed. Conversely, if the governor is acting in the reverse manner to bring the turbine up to normal speed it will while connecting the other clutch-magnet cut out all resistance from the field-circuit of the dynamo and raise the field strength, so as to restore normal conditions in the controller-solenoid before the turbine has regained its normal speed. In this manner I prevent overrunning of the governor by means which operates practically instantaneously and with no uncertainty due to friction and looseness of mechanical parts.

In addition to the contacts above mentioned I may provide a set of contacts or circuit-breakers (indicated at 26 27) which control the connection from dynamo 15 to the respective magnets 11 12, said circuit-breakers being controlled by means indicated at 28, which is operated, as set forth in my aforesaid application, to break the connection on one side or the other when the gate is fully opened or closed, so as to prevent further movement of the governor under such conditions in a direction which would strain the parts.

Instead of controlling a shunt around the field of a shunt-wound dynamo I may adapt any other suitable means for controlling the electrical effect of said dynamo on the electromagnetic controller by changing the amount of current delivered to said electromagnetic device, so as to counteract the effect of variation of dynamo speed for the purpose described.

Having thus described my invention, the following is what I claim as new therein and desire to secure by Letters Patent:

1. An apparatus for governing water-wheels, comprising a dynamo connected to be driven from said wheel, an electromagnetic device connected to said dynamo and controlling the governer responsively to the speed of the dynamo, and means controlled by said electromagnetic device to control the electrical effect of said dynamo on said electromagnetic device, in such manner that upon operation of said electromagnetic device due to variation in dynamo speed, the effect of such variation on the electromagnetic device will be counteracted, substantially as and for the purpose set forth.

2. An apparatus for governing water-wheels, comprising a dynamo connected to be driven from said wheel, an electromagnetic device connected to and responsive to the speed of the dynamo and controlling the action of the governor, and means for controlling the current in said electromagnetic device to counteract the effect of variation of dynamo speed therein, said means being controlled by the said electromagnetic device.

3. An apparatus for governing water-wheels, comprising a dynamo connected to be driven from said wheel, an electromagnetic device controlling said governor and connected to said dynamo so as to be responsive to the speed thereof, and means controlled by said electromagnetic device to control the strength of field of said dynamo, to counteract the effect of variation of speed thereof.

4. In a governor apparatus for the purposes described, the combination with the shunt-wound dynamo driven from the motor device to be governed, an electromagnetic device and means controlled thereby to govern the said motor device, of means controlled by said electromagnetic device to control a resistance in series with the field of said dynamo, substantially as and for the purpose set forth.

5. An apparatus for controlling the gate and by-pass of a water-wheel, comprising electromagnets controlling the operation of said gate in reverse directions, and an electromagnet controlling said by-pass, energized by shunt connection with the aforesaid electromagnets, and an electromagnetically-controlled contact-lever controlling the circuit connection of all said magnets.

LAMAR LYNDON.

Witnesses:
A. P. KNIGHT,
J. GREEN.